Aug. 11, 1953 D. SILVERMAN ET AL 2,648,778
AUTOMATIC DIAMETER COMPENSATION IN RADIATION WELL LOGGING
Filed Dec. 30, 1950 2 Sheets-Sheet 2

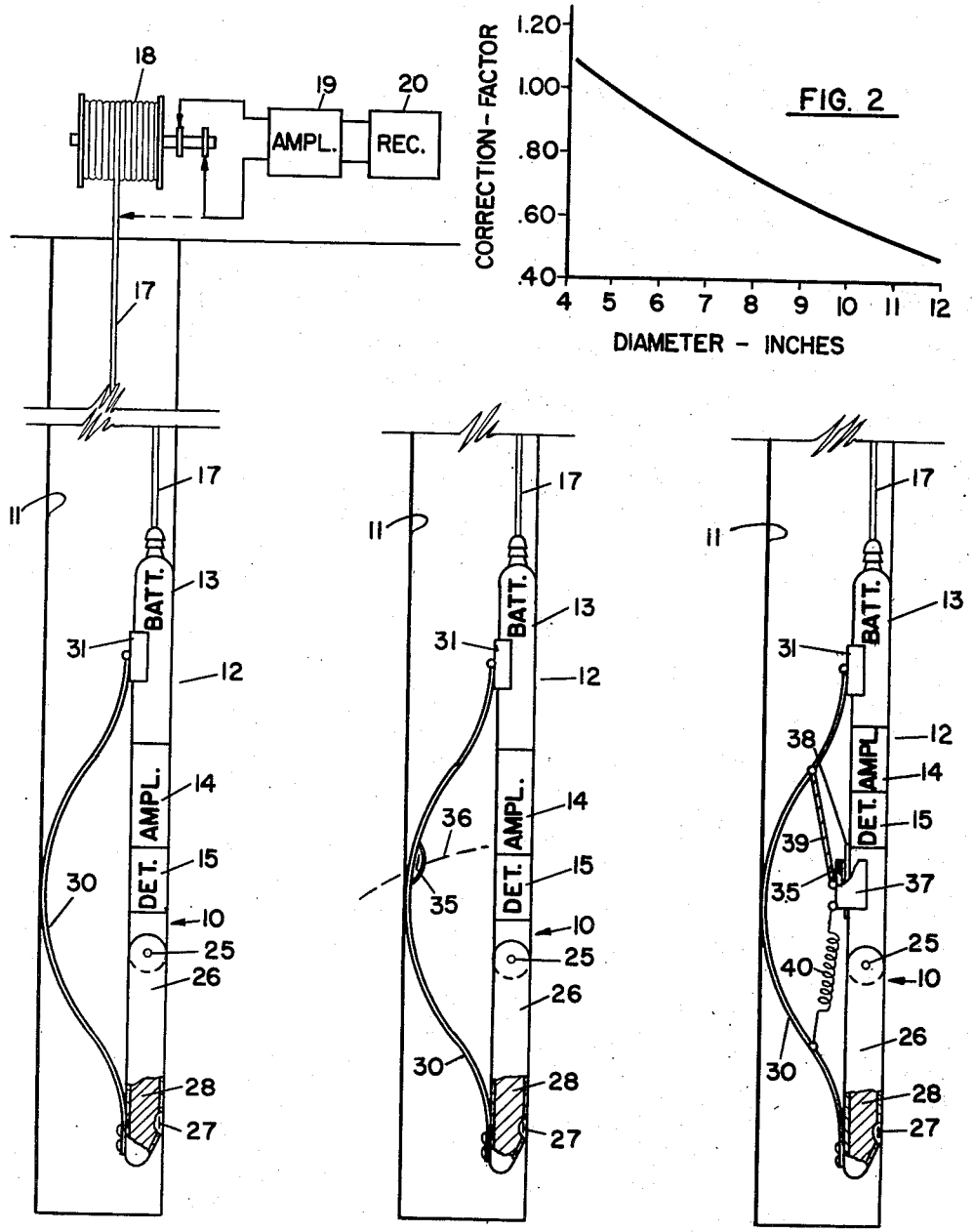

INVENTORS:
DANIEL SILVERMAN
GEORGE R. NEWTON
JIMMIE E. SKINNER

BY Newell Pottof
ATTORNEY

Patented Aug. 11, 1953

2,648,778

UNITED STATES PATENT OFFICE 2,648,778

AUTOMATIC DIAMETER COMPENSATION IN RADIATION WELL LOGGING

Daniel Silverman, George R. Newton, and Jimmie E. Skinner, Tulsa, Okla., assignors to Stanolind Oil and Gas Company, Tulsa, Okla., a corporation of Delaware Application December 30, 1950, Serial No. 203,738

15 Claims. (Cl. 250—83.3)

This invention relates to logging wells and is directed more particularly to measurements of the scattering and/or absorption of penetrating radiation such as gamma rays for logging well-formation densities and the like. Specifically it is directed to compensating automatically for the effects of varying well diameter on the measurements of the penetrating radiation.

While the principle of the invention is applicable to the automatic compensation of any type of penetrating-radiation measurement for the effects of well-diameter variation at the location of measurement, it will be described particularly in connection with the measurement of gamma-ray intensity after scattering and/or absorption by the well formations, for the purpose of determining formation densities.

We have been able to make generally satisfactory determinations of the density of well formations in place by gamma-ray scattering and absorption measurements, by employing a source and a detector of gamma rays spaced by a distance of the order of two feet, while maintaining the source in as close contact as possible with the well formations. This arrangement provides both a good sensitivity to density changes and a depth of investigation sufficient to minimize errors of measurement due to varying mud cake thickness and to invasion of the formations by drilling fluid filtrate.

The accuracy of the determination of a given formation density, however, is directly dependent upon the accuracy with which the gamma-ray intensity can be measured opposite that formation. Besides the desired variations of gamma-ray intensity with changes in the formation density, there are also similar variations in the gamma-ray intensity with changes in the well diameter. To a first approximation, it can be stated that, even with the best arrangement for sensitivity to well-formation density variations, there is still a very appreciable sensitivity to variations in well diameter. Since the latter are often relatively quite large, in fact, much larger than the relative variations in density, it is clear that reduction or elimination in some manner of the effect of diameter variations is vitally necessary.

If the diameter variations are known, the appropriate correction for diameter on the density measurements can be accomplished, but it is generally necessary to run a separate caliper log of a well in order to make the necessary determinations. This adds undesirably to the time and expense of making a formation-density survey.

It is, accordingly, a primary object of our invention to provide a compensation for the effect of well-diameter variations on the measurements of penetrating radiation made for logging well formations, which compensation is entirely automatic. Another object is to provide an automatic compensation for well-diameter variation effects on penetrating-radiation measurements in wells, which compensation can be performed within the well in a simple and reliable manner without unduly complicating the subsurface apparatus. A further object is to provide a method and apparatus for compensating well-diameter effects in radiation-measurement logging so as to eliminate the need for a simultaneous or independent caliper log of the well bore. Still another object is to provide in the measurement of penetrating radiation an automatic compensation for well-diameter effects such that the signals received for recording at the ground surface exhibit substantially no variations due to changes in the well diameter. A still further object is to provide an automatic compensation for well-diameter variations which is accomplished by simple mechanisms which operate without moving parts passing through the sealed wall of the subsurface instrument housing and thus avoid packing glands working against high-pressure well fluids. Other and further objects, uses, and advantages of the invention will become apparent as this description proceeds.

In the specific case of gamma-ray intensity measurements, for determining formation densities ranging from 1.9 to 2.9 grams per cubic centimeter, and in well-bore diameters varying from 4 to 12 inches, filled with water or fluid of similar specific gravity, the necessary correction has been determined with considerable accuracy. In general, this can be expressed in the form of a multiplying factor which varies in the reverse manner to the well diameter—that is, as the diameter increases, the factor decreases in magnitude, and vice-versa.

According to our invention, however, it is unnecessary either to know or to measure independently the well diameter in order to make the required correction in penetrating-radiation well logging, as this correction is automatically made or included in the detector response which is transmitted out of the well bore for recording at the ground surface. Preferably, this is accomplished by means controlled by or responsive to the well diameter operating on the penetrating-radiation detector to modify its output in the opposite direction to the output changes due to the diameter changes. One arrangement for per-forming this function, which is effective through the sealed wall of the well instrument but without packing glands, comprises means for varying the radiation received by the detector. Thus, according to one specific embodiment, an auxiliary or second source of penetrating radiation is used, and its irradiation of the detector is varied by a wall-contacting arm—for example, by changing the spacing between the auxiliary source and the detector, or by variably interposing a shield between them. In this embodiment, an apparent increase in radiation received by the detector from the main source as the well diameter increases is just offset by a corresponding decrease in the irradiation of the detector by the auxiliary source, so that, for any diameter, the sum of the radiation from the two sources is a constant, and the recorded indication then varies only with the formation property.

As there is in all cases some direct irradiation of the detector by radiation traveling along the well bore from the primary source, another embodiment of the invention therefore comprises interposing a movable shield between the primary source and the detector which effectively varies this direct irradiation. For example, we may employ a movable shield partially surrounding either the detector or the primary radiation source. While a similar effect of varying the direct irradiation can be achieved by changing the spacing from the primary source to the detector, this is generally less desirable in density logging because the sensitivity of the instrument to formation density variations changes with the spacing between the source and the detector.

Another way of regarding the compensation principle of this invention is to consider the total penetrating radiation received by the detector as made up of several components. The first one of these components varies with the formation variable—i. e., density. Another second one varies with the well diameter, and the problem solved by the invention is to determine the first component independently of the second. For this purpose, another or third component of radiation is introduced which varies just oppositely to the variations of the second, or diameter, component, so that the sum of the second and third components is a constant. The remaining variations on the recorded log are then those due to the first (density) component alone.

This will be better understood by reference to the accompanying drawings forming a part of this application and illustrating certain embodiments of our invention. In these drawings, wherein the same reference numerals are applied to the same or corresponding parts in the different figures:

Figure 1 shows a formation density-logging instrument in operating condition in a well shown in cross section;

Figure 2 is a graph showing a typical correction factor required to make the readings of the instrument of Figure 1 independent of well diameter;

Figure 8:
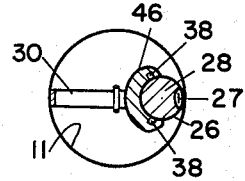
Figure 5:
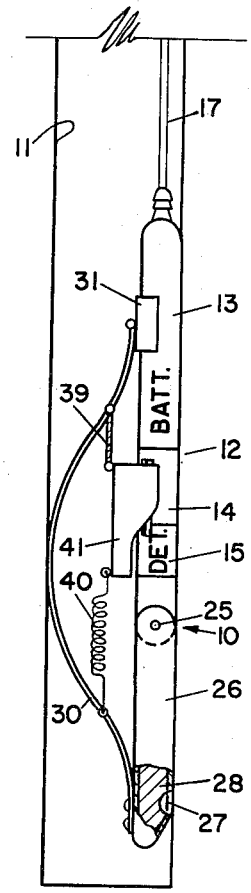
Figure 6:
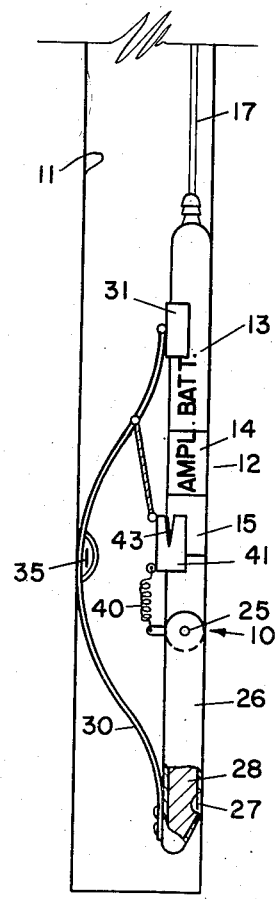
Figure 7:
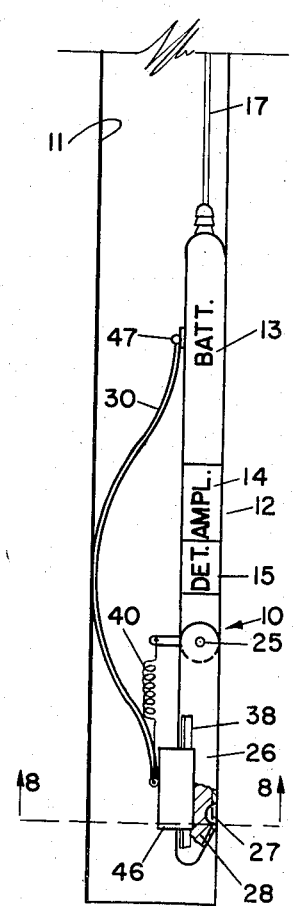

Figures 3, 4, 5, 6, and 7 are views similar to Figure 1 of an instrument in operating position in a well bore and including various different embodiments and modifications of our invention; and Figure 8 is a cross section of Figure 7 on the line 8—8.

Referring now to these drawings in detail and particularly to Figure 1, a logging instrument 10 of the type to which our invention is applicable is shown in operating position in a well 11. The instrument 10 comprises an elongated upper housing 12 containing a battery 13 and an amplifier 14, to the input of which is connected a penetrating-radiation detector 15. A cable 17 containing one or more insulated conductors suspends the instrument 10 in well 11 and transmits the response of detector 15, as amplified by amplifier 14, to the ground surface, where the conductor cable 17 is wound on a reel 18 from which are taken leads to a surface amplifier 19 operating a recorder 20. This system makes a record of the varying output of detector 15, preferably as a function of depth in well 11, in a conventional manner well known in the logging art.

Connected by a hinge 25 to the lower end of elongated housing 12 is a second shorter housing 26 containing a concentrated source 27 of penetrating radiation such as gamma rays, which source is preferably partially surrounded by a dense shielding material 28 of lead or tungsten. Since, for the maximum sensitivity to changes in well-formation density, it is necessary to maintain source 27 in as close contact with the formations of well 11 as possible, an elongated, curved, leaf spring 30 is attached to lower housing 26 near the position of source 27 and is coupled to a sliding collar 31 which presses against upper elongated housing 12. Due to the curvature of spring 30, its center portion presses against the wall of well 11 opposite to the instrument 10, so that its end portions press the source 27 and as much as possible of housing 12 into intimate contact with the well formations.

In the case of one specific instrument in this form, utilizing as the penetrating-radiation source about 100 milligrams of radium in equilibrium with its decay products, an optimum spacing between source 27 and detector 15 was found to be about two feet. Together with maintaining source 27 in close contact with the well wall, this spacing renders the sensitivity of the instrument to formation density changes a maximum. It is the function of hinge 25 to permit housing 26 to swing to one side and maintain source 27 in contact with the well wall regardless of whether elongated housing 12 remains in close contact with the wall or not.

This arrangement of source, detector, and formations, however, is still quite sensitive to changes in the well diameter, as appears in Figure 2, which is a curve of the varying diameter correction factor by which the recorded indications of the response of detector 15 are to be multiplied to eliminate the diameter effect. Although this curve, varying from a factor of 1.00 for a 5-inch well bore to 0.54 for a bore diameter of 11 inches, is applicable numerically only to the specific instrument mentioned, it demonstrates both the magnitude and character of the correction required. Thus, as the well diameter increases, the detector response also increases and must be reduced to be correct, and vice versa.

In accordance with the embodiment of our invention shown in Figure 3, this correction is automatically applied, without previous knowledge or determination of the well diameter, by affixing to the spring arm 30 an auxiliary source of gamma rays 35 in such a position adjacent the detector 15 that the distance between source 35 and detector 15 is varied in accordance with the well diameter. For example, as the well diameter increases, the source 35 is moved by the arm 30 along the dotted-line arc 36, thereby increasing the spacing between it and detector 15 and correspondingly decreasing the auxiliary irradiation of the detector. By varying the size of source 35 and shifting its position along arm 30 until the decrease in radiation from source 35 is just equal to the increase from source 27 as the well diameter increases, the compensation provided by the source 35 may be made as accurate as desired. For varying well diameters, the total radiation then received by the detector 15 from both source 27 and source 35 is constant, except as the scattered radiation from source 27 changes due to variations of the formation density. As it is not shielded from the detector by the well formations, most of the radiation reaching the detector from source 35 travels across the well bore and is relatively unaffected by the formation density.

As the auxiliary source is very much closer to the detector 15, on the average, than is the primary source 27, it is, of course, considerably smaller in size. As an example, in the instrument employing about 100 millicuries of radium and its decay products as the primary source 27, spaced about two feet from the detector 15 which was an argon ionization chamber filled to about 1000 p. s. i. and of 7 inches effective length, a small auxiliary source 35 consisting of radioactive paint equal to between $\frac{1}{10}$ and $\frac{1}{20}$ of a millicurie of radium equivalent, placed on the spring arm 30 just opposite the detector 15 gave the desired compensation in well bores filled with water or fluid of similar specific gravity.

As long as the density of the fluid or liquid filling the bore of well 11 is of a known or constant value, this simple embodiment of the invention is entirely effective. If, however, the density of the bore-hole fluid varies or is unknown, this affects the absorption of radiation from source 35, producing changes in the auxiliary radiation intensity at the detector 15 in addition to those changes due chiefly to the variations in distance of the source 35 with well diameter. The effect of such variations in density of fluid is minimized by an arrangement such as that shown in Figure 4. In this embodiment, the auxiliary source 35 is mounted on a sleeve carrier 37 held by a guide rod 38 close to the outside of housing 12. A flexible cord or wire 39 attached between carrier 37 and spring arm 30 moves the carrier 37 along with source 35 respectively closer to or farther away from detector 15 as the arm 30 varies its position in response to the well diameter, and collar 31 accordingly slides up or down on housing 12. The proportion of this up-and-down motion imparted from the arm 30 to the carrier 37 is easily variable by choice of the point of attachment of cable 39 to the arm 30. In order to make the movement of carrier 37 more positive, a tension spring 40 may be coupled between it and a lower portion of the instrument 10 to pull the carrier downwardly as arm 30 springs outwardly in a bore hole of increasing diameter.

A similar effect is obtained by the embodiment of our invention shown in Figure 5 but without employing a separate source 35 of gamma radiation as in Figures 3 and 4. It appears that an appreciable portion of the penetrating radiation from source 27 which reaches detector 15 travels at least part of the distance through the fluids filling the bore hole 11 instead of traversing the formations. This is due to the fact that the direction of travel of the gamma radiation is altered by each scattering process. The well-bore fluids, being ordinarily of less density than the formation, offer less absorption for penetrating rays from the source 27 to the detector 15 than do the paths through the formations.

The embodiment of Figure 5 takes advantage of this situation by interrupting varying amounts of this "direct" radiation traversing the well fluids, by manipulating a heavy shield 41 by the arm 30 in a manner somewhat similar to the movement of carrier 37 in Figure 4. The shield 41 is held close to the outside of housing 12 by the guide track 38 as in Figure 4, and is similarly moved up or down as necessary by the cable 39 coupled to the arm 30 and by the return spring 40. However, where the source 35 in Figure 4 was moved closer to the detector 15 by a decrease in the well diameter, in Figure 5 the shield 41 is raised to uncover increasingly greater portions of the detector 15 as the well diameter decreases. This has the effect of increasing the direct irradiation of detector 15 as the diameter decreases and vice versa, which is the type of correction required. The exact amount of this varying irradiation is adjusted as necessary by making the edge contour and/or the thickness of the shield 41 of the proper shape and magnitude.

In Figure 6 is shown an embodiment of our invention which combines certain features and advantages of the two arrangements shown in Figures 3 and 5. As is shown in Figure 6, the auxiliary source 35 is mounted on the wall-contacting arm 30 more or less directly opposite the detector 15, and an absorbing shield 41 is variably positioned by the arm 30 between the source 35 and the detector 15. Slots or openings 43 are cut in shield 41 with the correct contour as calculated or determined empirically to permit the desired varying amount of absorption to be interposed between the source 35 and the detector 15 to provide the exact desired correction factor. In this embodiment, the thickness of shield 41 and the amount of movement imparted to it by the arm 30 can be less than in the embodiment of Figure 5, for the reason that the variation in distance from the auxiliary source to the detector 15 in part provides the necessary variation in absorption of the auxiliary gamma rays impinging on detector 15. It is unnecessary to use the degree of care in selecting the size of auxiliary source 35 that is required in connection with the Figure 3 embodiment, for the reason that the openings 43 in shield 41 are easily varied to suit the particular auxiliary source 35 employed. Also, the sensitivity to fluid density variations is less than in Figure 3 because the shield 41 provides a major portion of the total absorption.

A further modification of our invention is shown in Figures 7 and 8. This embodiment resembles that of Figure 5 in that only a single source of gamma radiation is employed. A thick shield 46 is attached to the lower end of the wall-contacting arm 30 at a position approximately opposite the source 27 in lower housing 26. The upper end of spring 30, instead of being attached to a sliding collar 31, is, in Figure 7, hinged or fixed to elongated housing 12 at the point 47. As the well diameter varies, the shield 46 then is moved by the spring 30, in maintaining housing 26 and source 27 in contact with the well wall, in such a way that the shield 46 is variably positioned behind the source 27 and generally between it and the detector 15. This varies the direct irradiation of detector 15 from source 27 due to gamma rays traveling upwardly in the general direction of the well-bore axis and effectively reduces this irradiation of detector 15 when the well diameter increases, which is the type of correction previously shown to be appropriate. In adjusting the shield 46 to produce the necessary variation in absorbing power for different well diameters, the three variables of position, area, and thickness of the shield are available for adjustment. The simplest procedure for any given source and detector arrangement is to vary one of these at a time, until the required absorption and range of variation thereof are obtained.

In general, however, the shielding arrangement of Figure 5 is preferable for the reason that some of scattered radiation reaching detector 15 through the well bore does not leave the source 27 in a direction to be intercepted by the shield 46 of Figure 7. Thus, some radiation enters the formations directly from source 27 and is promptly scattered back into the well bore, but not where it can be controlled by shield 46. Also, because of the relatively smaller dimensions of source 27 compared with detector 15, the accuracy of placement of shield 46 must be greater in the embodiment of Figure 7.

Although all of the illustrated embodiments of our invention have used the same arm 30 for holding the source against the well wall and varying the irradiation of the detector, the two functions could likewise be performed by separate arms. Thus, while our invention has been described in terms of the foregoing specific embodiments, it is to be understood that other modifications will be apparent to those skilled in the art. The invention, therefore, should not be considered as limited strictly to the described details but is to be ascertained from the scope of the appended claims.

We claim:

1. The method of logging well formations in well bores of varying diameter which comprises irradiating the well formations with penetrating radiations from a source thereof, measuring at a point removed from said source the intensity of said penetrating radiations part of which have traversed the well formations and part of which have traveled generally through the well bore, whereby variations in said intensity occur as the well-bore diameter varies, producing variations in the measured value of said intensity opposite to the variations occurring with well-diameter changes, and recording the resultant value of said intensity as a function of depth in said well bore, whereby a log is obtained which is substantially free of variations due to well-diameter changes.

2. The method of logging well formations in wells of varying diameter which comprises irradiating the well formations with penetrating radiations from a concentrated source thereof, measuring with a detector spaced from said source the intensity of the penetrating radiations received by said detector as a result of the irradiation by said source, moving a radiation-varying element to vary the radiation received by said detector substantially as an inverse function of the changes in well diameter, and recording as a function of depth in the well an indication of the response of said detector.

3. The method of logging well formations in well bores of unknown or varying diameter which comprises irradiating the well formations with penetrating radiations from a first concentrated source thereof, maintaining said first source in close contact with the well formations, measuring with a detector spaced at a distance from said source the intensity of the penetrating radiations received from said source after scattering and absorption in the surrounding media, variably irradiating said detector with penetrating radiations from a second source thereof with an intensity varying as an inverse function of the well diameter, and recording an indication of the total intensity received by said detector as a function of depth in said well bore.

4. The method of logging to determine the density of well formations in well bores of unknown or varying diameter which comprises irradiating the well formations with gamma rays from a concentrated source thereof, maintaining said source in close contact with said well formations, measuring with a detector spaced from said source the intensity of said gamma rays after scattering and absorption in the surrounding media, variably interposing between said source and said detector a shield adapted to vary the radiation received by said detector from said source as an inverse function of the well diameter, and recording an indication of said intensity as a function of depth in said well bore.

5. Apparatus for logging well formations in well bores of varying diameter comprising a source of penetrating radiations, a detector of said radiations spaced from said source, wall-engaging means near said detector movable in response to well-diameter changes, means actuated by said wall-engaging means to produce a response from said detector varying as an inverse function of the well diameter, and recording means connected to said detector for recording as a function of depth an indication of the resultant detector output.

6. Apparatus for logging formations exposed in a well bore of varying diameter which comprises a concentrated source of penetrating radiations, a wall-contacting spring arm associated with said source adapted to hold it in close contact with the well formations, a detector of penetrating radiations spaced from said source, means coupled to said spring arm and movable thereby in proportion to the variations in well diameter adapted to vary the radiation received by said detector as an inverse function of the well diameter, and means coupled to said detector for recording as a function of depth in the well bore an indication of the radiation intensity received by said detector.

7. Apparatus for logging to determine the density of formations exposed in a well bore of unknown or varying diameter which comprises a first concentrated source of gamma rays, a wall-contacting spring arm associated with said first source adapted to hold it in close contact with the well formations, a gamma-ray detector spaced at a fixed distance from said first source, a second concentrated source of gamma rays, said second source being movable and coupled to said spring arm whereby the spacing of said second source from said detector may be varied, said spacing being varied by said arm in the same sense as the changes in well diameter, and recording means coupled to said detector for recording as a function of depth in said well an indication of the gamma-ray intensity received by said detector.

8. Apparatus according to claim 7 in which said second source of gamma rays is located on said spring arm approximately opposite to said detector.

9. Apparatus for logging to determine the density of formations exposed in a well bore of unknown or varying diameter which comprises a gamma-ray detector, a concentrated source of gamma rays spaced from said detector, a spring arm associated with said source adapted to hold it in close contact with the well formations and movable in accordance with the well diameter, shielding surrounding and between said source and detector substantially preventing direct irradiation of said detector by said source, a movable shield actuated by said spring arm to vary the amount of radiation received by said detector from said source as an inverse function of the well diameter, and circuit means connected to said detector for recording as a function of depth in said well an indication of the gamma-ray intensity received by said detector.

10. Apparatus for logging to determine the density of formations exposed in a well bore of unknown or varying diameter which comprises a first source of gamma rays, spring means contacting the bore wall and associated with said first source adapted to hold it in close contact with the well formations, a detector of gamma rays spaced from said first source, recording means connected to and actuated by the output of said detector, a second source of gamma rays, and means actuated by said spring means in contacting bore hole walls of varying diameter, for varying the spacing between said second source and said detector as the well diameter varies, in the same sense and in an amount to substantially offset the variation in intensity of gamma rays received from the first source due to the variations in well diameter.

11. Apparatus for logging to determine the density of formations exposed in a well bore of unknown or varying diameter which comprises a first concentrated source of gamma rays, a detector of gamma rays spaced from said first source, recording means connected to and actuated by the output of said detector, a wall-contacting arm associated with said first source adapted to hold it in close contact with the well formations, an elongated housing containing said detector, a carrier movable axially along the outside of said housing, a second source of gamma rays mounted on said carrier, and means coupling said arm and said carrier adapted to increase the distance between said second source of gamma rays and said detector as the well diameter increases.

12. Apparatus for logging to determine the density of well formations exposed in a well bore of unknown or varying diameter which comprises a first source of gamma rays, a detector of gamma rays spaced from said source, recording means connected to and actuated by the output of said detector, a wall-contacting arm associated with said source adapted to hold it in close contact with the well formations, a second source of gamma rays carried by said arm in a position to be variably spaced from said detector, a shield movably actuated by said arm between said second source and said detector, said shield being moved by said arm in a direction to reduce the radiation from said second source impinging on said detector when said well diameter increases.

13. Apparatus for logging to determine the density of formations exposed in a well bore of unknown or varying diameter which comprises a concentrated source of gamma rays, a detector of gamma rays spaced from said source, recording circuit means connected to and actuated by the output of said detector, a wall-contacting arm associated with said source adapted to hold it in close contact with the well formations, a shield associated with and movable by said arm and variably positioned thereby between said source and detector, said shield being adapted to reduce the amount of irradiation of said detector by said source as the well diameter increases.

14. Apparatus according to claim 13 in which said shield is located adjacent said detector.

15. Apparatus according to claim 13 in which said shield is located adjacent said source.

DANIEL SILVERMAN.
GEORGE R. NEWTON.
JIMMIE E. SKINNER.

References Cited in the file of this patent

UNITED STATES PATENTS

| Number | Name | Date |
| --- | --- | --- |
| 2,369,672 | Hare | Feb. 20, 1945 |